Dec. 24, 1935.  G. P. GILMAN  2,025,279
SEAL FOR ROTATING SHAFTS
Filed June 9, 1934
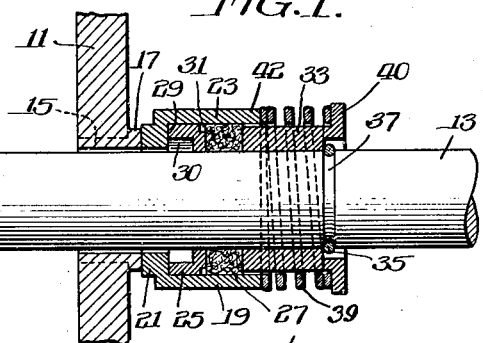
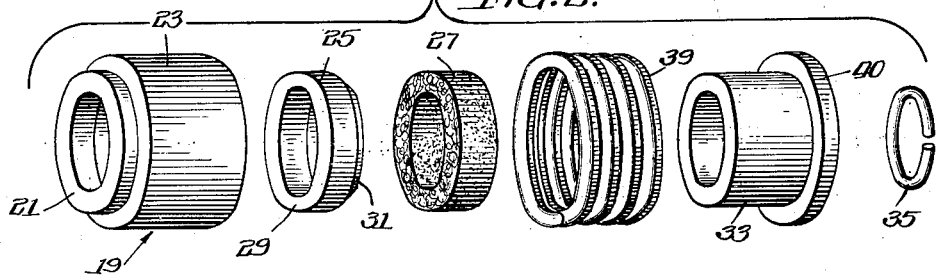
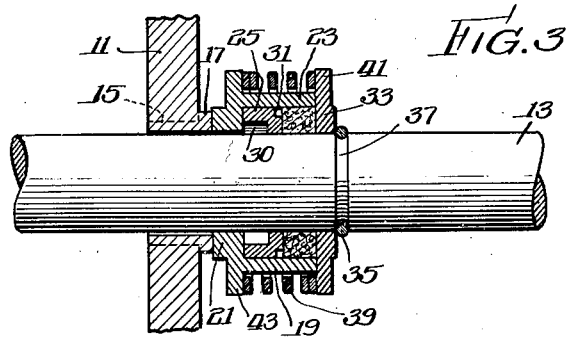
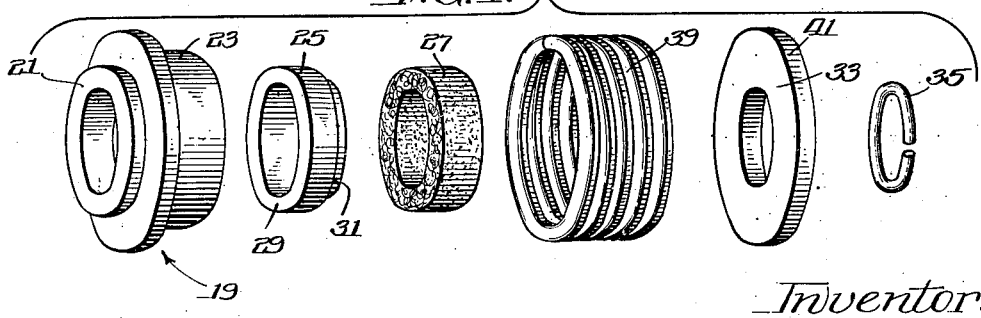
Inventor:
George P. Gilman
By: Cox & Moore, attys.

Patented Dec. 24, 1935

2,025,279

UNITED STATES PATENT OFFICE 2,025,279

SEAL FOR ROTATING SHAFTS

George P. Gilman, Chicago, Ill., assignor to Rotary Seal Company, Chicago, Ill., a corporation of Illinois Application June 9, 1934, Serial No. 729,785

1 Claim. (Cl. 286—7)

My invention relates in general to seals and has more particular reference to the sealing of rotating shafts to prevent the escape of fluids along the shaft past a journal or wall through which it extends.

Among the important objects of my present invention is to provide a sealing device for preventing the escape of fluids under pressure through the space between a rotating shaft and the journal in which it is mounted for rotation.

Another important object of the invention is to provide a device adapted to be mounted, on a shaft to be sealed, without specially altering or conditioning the shaft, or associated parts, such as the wall or journal through which it extends, in order to accommodate the seal. Devices, embodying my present invention, can be made for use on shafts of all sizes to seal against the escape of fluids under substantial pressures, and the seal operates as well at high rotating shaft speeds as at low.

Another important object is to provide an inexpensive seal construction, easy to manufacture and assemble, which provides effective sealing for rotating shafts, which is wear-resistant, and which will provide continuous and uniformly satisfactory sealing over long periods of service without adjustment or other care.

Another important object resides in the provision of a self-contained device of the class described, which is adapted for sale as a unit for rapid attachment on a shaft to be sealed.

Another important object is to provide a sealing device adapted for assembly on a rotating shaft and comprising a pair of co-operating annular elements forming an expansible chamber therebetween, including means to prevent longitudinal movement on the shaft in one direction of one of the annular elements so that the other element may be forced into seating engagement with a wall, through which the shaft extends, by virtue of pressure developed within the expansible chamber by the escapement of gases under pressure along the shaft and through the wall and the wall seating member into said chamber.

Numerous other objects and advantages will be more fully understood from the following description, which, taken in connection with the accompanying drawing, discloses a preferred embodiment of my invention.

Referring to the drawing:

Figures 1 and 3 are sectional views through shaft seals embodying my present invention; and Figures 2 and 4 respectively are exploded views, showing parts forming the seals illustrated in Figures 1 and 2.

To illustrate my invention, I have shown, on the drawing, shaft seals 9 embodying my inventive concept. These seals are shown each mounted on a rotating shaft 13, adjacent an opening 15 in a wall 11 through which the shaft extends. The wall 11 may form a part of a casing, such as a pump or compressor casing, containing fluid under pressure and the seals are adapted and arranged in position to seal the wall opening against the escape of fluid from the casing along the shaft through the opening.

The wall is preferably formed with a boss 17 around the opening 15 and facing the seal 9, and this boss, if desired may be formed as a part of a bushing, indicated in dotted lines, which may be fitted into the opening 15 to form a bearing adapted to snugly receive and support the shaft rotatably in the wall opening.

The foregoing is a common journal structure and the sleeve is frequently provided with an annular shoulder 17 at one end to engage the surface of the wall 11 in order to prevent the sleeve from passing longitudinally through the perforation in the wall 11.

The sealing devices 9 each comprise a cup-shaped element 19 adapted to loosely encircle the shaft and having an annular bead 21 adapted to bear upon and form a running seal with the wall 11 around the opening 15, the bead being preferably of a size to engage the embossed portion 17, which preferably has a finished surface upon which the bead rides.

The walls of the cup-shaped element 19 are spaced from the shaft to provide an annular pocket, in which is arranged a second cup-shaped element 25 and a sealing gasket 27, the cup-shaped element 25 having side walls to snugly fit the inner surfaces of the walls 23 of the element 19 and being assembled therein with its edges 29 bearing upon the bottom of the element 19. The inner walls of the element 25 are spaced from the shaft to provide a chamber 30. The gasket 27 rests upon the bottom of the element 25, the peripheral edges of which may be grooved as at 31 to retain a liquid to assist in the sealing and the gasket and element are held in the cup-shaped element 19 by means of a closure member 33 of annular form, which is anchored in place on the shaft in any suitable manner, as by the ring 35, which seats in a groove 37 formed on the shaft.

A spring 39, or other suitable yielding means, is interposed between the elements 19 and 33 in order to resiliently urge the element 19 along the shaft in a direction to bear the bead 21 against the wall 11.

In Figure 1, the element 33 comprises a bushing having an end received within the walls 23 of the element 19 in position to bear upon the gasket and keep it and the element 25 in place, while the spring bears at one end upon a flange 40 formed on the element 33 and at its other end upon the open end edge 42 of the member 19.

In the embodiment shown in Figure 3, the spring embraces the walls of the element 19, and, at one end, engages the peripheral edge 41 of the element 33, which is a disk overlying the open end of the element 19, and the spring engages, at its other end, upon an outstanding flange 43 on the element 19.

The seal is arranged to receive fluid under pressure, which escapes through the opening 15, within the chamber 30 where said fluid operates to urge the parts 19 and 25 in opposite directions on the shaft. The sealed fluid thus assists the spring 39 in urging the member 19 to seat upon the wall 11 and also urges the member 25 to pack the gasket firmly between the shaft and walls 23. The parts 19 and 25 thus operate as a cylinder and piston having a chamber expansible under the influence of the pressure of the sealed fluid in order to increase the sealing effect, the pressure of the sealed fluid, itself, functioning to increase the sealing effect so that the greater the pressure, the greater the sealing effect.

Seals embodying my present invention may be applied to the shaft without materially altering the same, it being merely necessary to fasten the member 33 in place thereon and accurately finish the boss 17 on the wall. Since the boss is usually present in the form of a bushing end, the application of the seal to existing shaft structures may be accomplished with minmum effort. The seals may, therefore, be manufactured to standard specifications and sold without reference to the structure of the shaft or its associated parts, the only necessary data required being the diameter of the shaft to be fitted.

It is thought that the invention and numerous of its attendant advantages will be understood from the foregoing description and it is obvious that numerous changes may be made in the form, construction, and arrangement of the several parts without departing from the spirit or scope of my invention or sacrificing any of its attendant advantages; the form herein described being a preferred embodiment for the purpose of illustrating my invention.

Having thus described my invention, what I claim as new and desire to secure by Letters Patent is as follows:

A seal for a rotating shaft, which extends through a wall, comprising a pair of co-operating annular members adapted to encircle the shaft and forming therebetween an expansible chamber, one of said members being received within the other, resilient sealing means in said enclosing member behind the enclosed member, means to hold said enclosed member and sealing means within the enclosing member, stop means to limit the movement of said members away from the wall, and resilient means co-operatively associated between the enclosing member and said stop means for urging said enclosing member to seat upon the wall around the shaft without influencing the enclosed member, whereby to form a ground joint with said wall in order to prevent the escape of fluid under pressure radially through the ground joint while permitting fluid under pressure to enter the expansible chamber.

GEORGE P. GILMAN.